US007011191B2

(12) United States Patent
Spicer et al.

(10) Patent No.: US 7,011,191 B2
(45) Date of Patent: Mar. 14, 2006

(54) LOCKING STRUT

(75) Inventors: Gary Spicer, Mississauga (CA); Gerald J. Hamers, Woodbridge (CA); Terry Cleland, Brampton (CA); John W. Miller, Innisfil (CA); Zbyslaw Staniewicz, Scarborough (CA)

(73) Assignee: Litens Automotive, Woodbridge (CA)

( * ) Notice: Subject to any disclaimer, the term of this patent is extended or adjusted under 35 U.S.C. 154(b) by 0 days.

(21) Appl. No.: 10/688,161

(22) Filed: Oct. 17, 2003

(65) Prior Publication Data
US 2004/0112694 A1 Jun. 17, 2004

Related U.S. Application Data

(60) Provisional application No. 60/419,286, filed on Oct. 17, 2002.

(51) Int. Cl.
*F16F 15/03* (2006.01)
(52) U.S. Cl. ............... 188/267; 188/161; 188/322.15; 188/322.22
(58) Field of Classification Search ............... 188/266, 188/267, 267.2, 161, 322.13, 322.22, 316, 188/317, 322.15
See application file for complete search history.

(56) References Cited

U.S. PATENT DOCUMENTS

| 2,630,887 | A |   | 3/1953  | Pacquin         |          |
|-----------|---|---|---------|-----------------|----------|
| 3,388,883 | A |   | 6/1968  | Axthammer et al.|          |
| 4,156,523 | A |   | 5/1979  | Bauer           |          |
| 4,257,582 | A |   | 3/1981  | Wirges          |          |
| 4,632,228 | A |   | 12/1986 | Oster et al.    |          |
| 4,784,375 | A |   | 11/1988 | Wirges          |          |
| 4,793,450 | A |   | 12/1988 | Savenije        |          |
| 4,807,855 | A |   | 2/1989  | Schuitema       |          |
| 4,949,941 | A |   | 8/1990  | Bauer et al.    |          |
| 4,993,522 | A |   | 2/1991  | Wagner          |          |
| 5,067,687 | A | * | 11/1991 | Patel et al.    | 188/163  |
| 5,097,928 | A |   | 3/1992  | Enders et al.   |          |
| 5,388,677 | A |   | 2/1995  | Rosch           |          |
| 5,389,018 | A |   | 2/1995  | Funami          |          |
| 5,397,111 | A |   | 3/1995  | Knopp et al.    |          |
| 5,435,529 | A |   | 7/1995  | Day et al.      |          |
| 5,450,933 | A |   | 9/1995  | Schuttler       |          |
| 5,538,115 | A |   | 7/1996  | Koch            |          |
| 5,553,690 | A |   | 9/1996  | Takahashi       |          |
| 5,839,719 | A |   | 11/1998 | Hosan et al.    |          |
| 5,887,857 | A |   | 3/1999  | Perrin          |          |
| 6,125,975 | A | * | 10/2000 | Seeto et al.    | 188/171  |
| 6,471,017 | B1| * | 10/2002 | Booz et al.     | 188/72.7 |
| 6,505,718 | B1| * | 1/2003  | Fujita et al.   | 188/267  |
| 2002/0017748 | A1 |   | 2/2002 | Sander et al.   |          |
| 2002/0174604 | A1 |   | 11/2002| Lauberbach et al.|         |

\* cited by examiner

*Primary Examiner*—Melanie Torres
(74) *Attorney, Agent, or Firm*—Clark Hill PLC (57) ABSTRACT

A locking strut including a housing with a piston rod extending therethrough. A baffle mounts on the piston rod to divide the housing into two chambers. An orifice through the baffle allows fluid to pass between the chambers to damp reciprocating movement. An electromagnetic driver within the housing is selectively energized to move a ferromagnetic plate between an open position, wherein fluid flows freely between the chambers, and a closed position, wherein the ferromagnetic plate blocks the orifice to prevent fluid flow between the chambers and lock the locking strut in position. A plurality of orifices may be spaced about the baffle, with the number and size of the orifices determining the damping capability of the locking strut. A plurality of drivers may be disposed within the housing to overcome fluid forces during movement of the locking strut between an extended and a retracted position.

19 Claims, 7 Drawing Sheets

LOCKING STRUT

RELATED APPLICATION

This application claims priority to and all the benefits of U.S. Provisional Patent Application No. 60/419,286, filed on Oct. 17, 2002.

BACKGROUND OF THE INVENTION

1. Field of the Invention

The present invention relates to a strut that can be locked by an external power source to assist in termination of further motion of the strut, particularly for use in a door.

2. Description of Related Art

Motor vehicle liftgates act to both provide access and close and seal the rear cargo area of a motor vehicle. Typically, the liftgate is pivotally mounted in a frame at the rear of the vehicle and pivots about a hinge defining a horizontal axis. The liftgate rotates between a closed position securedly resting within the frame and an open position, wherein the liftgate is pivoted away from the frame to allow access to the cargo area. The liftgate is often very heavy and must be moved against gravity to reach an open position. Access to the cargo area is difficult and dangerous when a user is required to lift the liftgate to the open position unassisted, and then hold the liftgate in position while accessing the cargo area.

Most modern vehicles use gas or spring-loaded cylindrical struts to assist the user while opening the liftgate, and then to hold the liftgate in an open position. Typically, the user manually provides the initial force necessary to partially open the liftgate. The strut then provides a spring force and a moment arm sufficient to overcome the weight of the liftgate and move the liftgate to a fully opened position. The spring force and the moment arm of the strut then act to hold the liftgate in the open position while the user accesses the cargo area. To return the liftgate to a closed position, the user must typically thrust downward on the liftgate, applying a force sufficient to overcome the upward forces exerted by the strut. Typically a liftgate assembly includes two struts at opposite ends of the frame. One end of each strut is pivotally mounted to the liftgate, while the other end of each strut is pivotally mounted to either the frame or the motor vehicle.

Powered systems for automatically moving vehicle liftgates between an open and a closed position are also known in the art. Typically in such systems, a power actuator applies a force directly to the liftgate. For example, U.S. Pat. No. 5,531,498 to Kowall discloses a typical liftgate opening system wherein the struts are actuated by a pair of cables wound around a spool by an electric motor, replacing the user-supplied force necessary to initiate movement of the liftgate. However, a significant amount of power is required to operate such a system, resulting in a mechanism that is usually quite large and uses a significant amount of vehicle space.

Another example of a powered liftgate system is illustrated in U.S. Pat. No. 6,367,864 to Rogers, Jr. et al. This system provides a rod in addition to the struts. The rod is pivotally mounted to a follower mounted on a fixed linear channel. A flexible drive loop moves the follower to drive the liftgate between open and closed positions. Since the liftgate is directly connected to the drive, some form of clutch or disengagement mechanism is required to allow manual operation of the liftgate. This disengagement mechanism further consumes vehicle space while also increasing costs.

U.S. Pat. No. 5,120,030 to Lin et al. provides yet another example of a powered liftgate system. A magnet is provided on a piston to better retain the piston in a fully extended position. The force exerted by the magnet acts with the force generated by the strut to increase the force required to initiate compression of the strut when moving the door out of an open position. For example, with the strut fully extended, a force between 600 N at a strut temperature of $-40°$ C. and 800 N at a strut temperature of $+85°$ C. is required to initiate collapse of the strut with the magnetic force disabled. When the magnet is engaged, a considerably higher initial force is required to overcome the magnetic force. After this initial force is applied and the magnetic force is overcome, the strut collapses normally. The disadvantage with this type of system is that the separation of the magnet may require a rising force followed by a sudden release, causing the liftgate to lurch at the point of release.

Control systems for powered liftgate systems are also known in the art. Such control systems usually include an obstacle detection component to stop the liftgate while opening or closing if an obstacle is encountered. Typically the control system measures the force applied by the liftgate or the actuator motor, or the rate at which the motor is moving. The liftgate is stopped if anomalies are detected in the measurements tending to indicate that an obstacle has been encountered.

Finally, a large engagement force is necessary to activate most prior art locking struts, which typically include a driver outside of the strut housing. In this type of system, a rod must travel down the center of a piston rod to translate the signal from the driver to a valve. A significant pressure differential exists between the outside atmospheric pressure where the driver is located and the pressure within the housing. To resist this pressure differential, the driver must exert a significant engagement force to activate the valve. Therefore, it is desirable to provide a system wherein the driver is housed within the housing, thereby reducing or eliminating the pressure differential and requiring much lower engagement forces.

It is desirable to provide a a locking strut or struts to smoothly open and close the liftgate and lock the strut in a fully extended position without adding unnecessary bulk or cost to the vehicle.

Additionally, it is desirable to provide a driver located within a strut housing to significantly decrease the pressure differential between the driver and a valve. The strut is connected to a control system to provide for control of the strut during movement between open and closed positions.

SUMMARY OF THE INVENTION

Accordingly, the present invention provides a locking strut including a housing with a piston rod extending therethrough. A baffle mounts on the piston rod to divide the housing into two chambers. An orifice through the baffle allows fluid to pass between the chambers to damp reciprocating movement. An electromagnetic driver within the housing is selectively energized to attract or repel a ferromagnetic plate to move the plate between an open position, with fluid flowing freely between the chambers, and a closed position, wherein the orifice is blocked to prevent fluid flow between the chambers and lock the strut in position. A plurality of orifices may be spaced about the baffle, with the number and size of the orifices determining the damping capability of the strut. A plurality of drivers may be disposed within the housing to overcome fluid forces during movement of the strut between an extended and a retracted position.

By placing the driver inside the housing, much of the bulk and cost of typical locking strut systems is eliminated. Additionally, locating the driver within the housing decreases the pressure differential between the driver and the valve, greatly reducing the force needed to engage the locking mechanism. A control system connected to the driver selectively energizes the driver for greater control over the system during movement. A plurality of drivers can be used to provide even greater control over the selective locking function of the strut.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to FIGS. 1 through 12, there is illustrated a locking strut 10 of the present invention. The strut 10 comprises a hollow housing 12 hermetically sealed with an opening 11 at one end. The housing 12 is preferably a cylinder. A piston rod 14 extends through the opening 11 in a sealed fit. The piston rod 14 moves with respect to the housing 12 between an extended position and a retracted position. A baffle 16 mounts to the piston rod 14 within the housing 12 separating the housing 12 into an upper chamber 18 and a lower chamber 20. The baffle 16 slidingly engages the interior walls of the housing 12 to slide along the housing 12 as the piston rod 14 moves between the extended and retracted positions. At least one orifice 22 extends through the baffle 16 defining fluid passageways through the baffle 16 to allow fluid to pass between the chambers 18, 20. While the fluid is preferably air, other fluids, for example oil, may be used without changing the inventive concept. Additionally, while the embodiments shown in FIGS. 1 through 12 illustrate two orifices 22, any number of orifices 22 may be used, with the total number and size of orifices 22 determining the amount of damping provided by the strut 10.

A driver 24 mounts within the housing 12. The driver 24 comprises an electromagnetic coil energizable to produce an electromagnetic driver force. Electrical leads 26 extend from a power source through the piston rod 14, connecting to the driver 24 to selectively provide power to energize the driver 24 in response to external control signals. For example, a control system could measure a force on the locking strut 10 during movement from an open position to a closed position and energize the driver 24 upon the detection of an excessive force, perhaps indicating the presence of an obstacle. The driver 24 may also be energized in response to a program sequence or a position control detection system.

Preferably, the driver 24 is energized according to a pulse width modulation signal, wherein current is rapidly cycled through the leads 26 from the power source to the driver 24, thereby producing a partial duty cycle. Pulse width modulation is preferred over a constant supply of power because it provides more control of the driver 24, especially when pressure is high. Increased control over the driver 24 is particularly important to prevent the locking strut 10 from accelerating more rapidly than desired. For example, when the locking strut 10 is used in a door, it is necessary for the door to close at an appropriate speed. As the piston rod 14 travels from an extended position to a retracted position, and thus the door travels from an open position to a closed position, pulse width modulation effects a slower change between the two positions, providing more control during movement.

Figure 1:
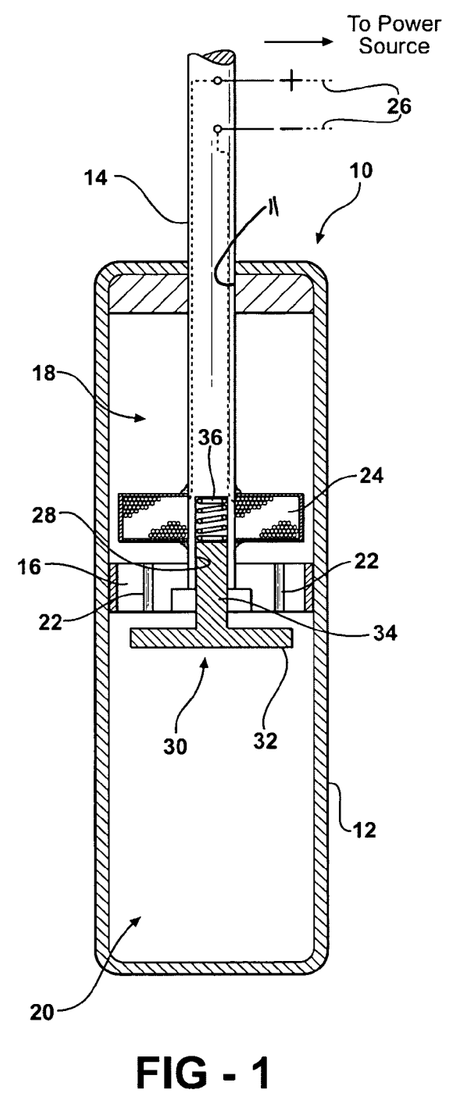
FIG. 1 is a cross-sectional view of a first embodiment of a locking strut according to the present invention showing the strut in an unlocked condition, wherein a plurality of orifices are unblocked to allow fluid flow between two chambers of a housing.
Figure 2:
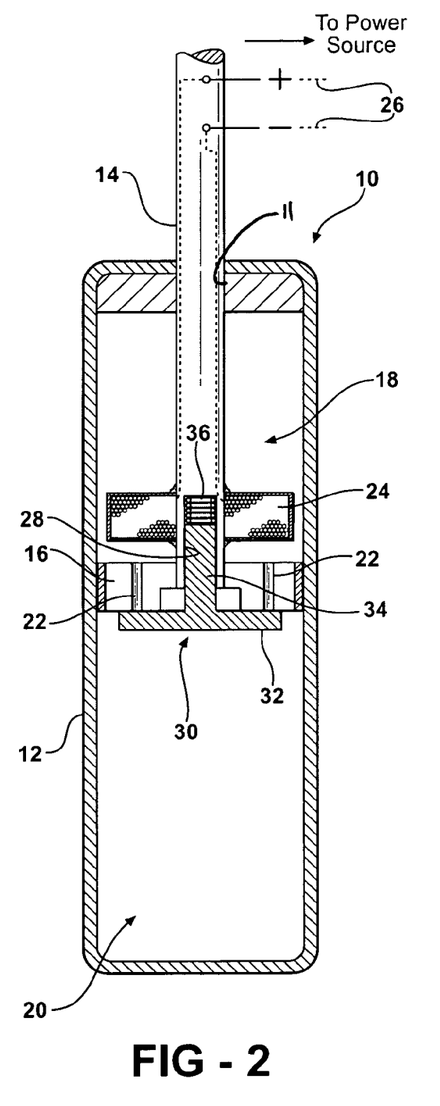
FIG. 2 is a cross-sectional view of the locking strut of FIG. 1 in a locked condition, wherein the orifices are blocked by a plate, preventing fluid flow between the chambers and locking the locking strut.

Turning now to the first embodiment illustrated in FIGS. 1 and 2, the piston rod 14 includes an opening 28 for receiving a ferromagnetic plate 30. The ferromagnetic plate 30 is disposed within the housing 12 for movement between an open position space from the baffle 16 for allowing fluid to pass through the orifices 22 and a closed position covering the orifices 22 to prevent flow of fluid between the chambers 18, 20. The ferromagnetic plate 30 comprises an annular flange 32 and a stem 34, with the stem 34 extending through the baffle 16 and fitting within the opening 28 in the piston rod 14. The flange 32 comprises a ferromagnetic material such that it is attracted or repelled by an electromagnetic force. A valve spring 36 disposed within the opening 28 exerts a spring force on the stem 34 of the ferromagnetic plate 30. When the flange 32 is spaced from the baffle 16, the locking strut 10 is in an unblocked condition, whereby fluid can freely pass between the chambers 18, 20 through the orifices 22 allowing the piston rod 14 to move between the extended and retracted positions. In a locked condition, the flange 32 engages the baffle 16 to cover the orifices 22, preventing fluid flow between the chambers 18, 20, and locking the piston rod 14 in place.

Each embodiment of the present invention may be operated from the open position to the closed position, or from the closed position to the open position. In a first configuration of each embodiment, the valve spring 36 is in a resting state, meaning the valve spring 36 is neither compressed nor expanded, when the ferromagnetic plate 30 is in the open position as shown in FIGS. 1, 3, 5, 7, 9 and 11. Energization of the driver 24 moves the ferromagnetic plate 30 to the closed position shown in FIGS. 2, 4, 6, 8, 10 and 12. De-energizing the driver 24 returns the ferromagnetic plate 30 to the open position. In a second configuration, the valve spring 36 is in the resting state when the ferromagnetic plate 30 is in the closed position, and energization of the driver 24 moves the ferromagnetic plate 30 to the open position. In this configuration, de-energizing the driver 24 returns the ferromagnetic plate 30 to the closed position.

Returning now to the first embodiment shown in FIGS. 1 and 2, the driver 24 preferably mounts on the piston rod 14 above the baffle 16 and the ferromagnetic plate 30 is positioned below the baffle 16. In a first configuration, energizing the driver 24 magnetically attracts the flange 32 of the ferromagnetic plate 30. The electromagnetic force exerted by the energized driver 24 overcomes the spring force exerted by the valve spring 36 and the stem 34 moves upward, compressing the valve spring 36 within the opening 28 in the piston rod 14. The flange 32, being attached to the stem 34, likewise moves upward to engage the baffle 16, closing off the orifices 22 to prevent further fluid flow between the chambers 18, 20 and thus prevent movement of the piston rod 14. When the driver 24 is de-energized, the valve spring 36 urges the ferromagnetic plate 30 back downward, thereby unblocking the orifices 22 to resume fluid flow between chambers 18, 20 and normal operation of the locking strut 10. In a second configuration, energizing the driver 24 repels the flange 32, expanding the valve spring 36 to disengage the flange 32 and the baffle 16 to unblock the orifices 22. When the driver is de-energized, the valve spring 36 urges the stem 34 back into the opening 28, re-blocking the orifices 22.

Figure 3:
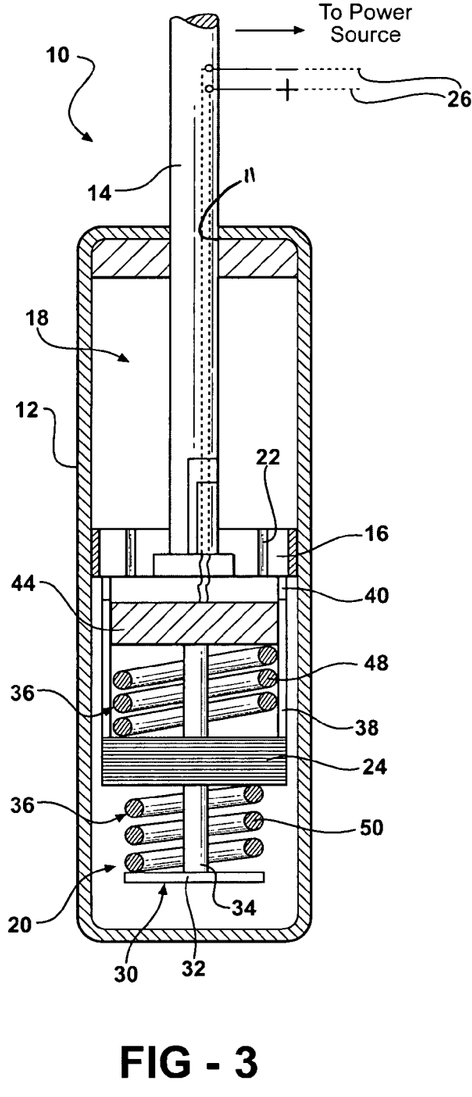
FIG. 3 is a cross-sectional view of a second embodiment of the locking strut showing the strut in the unlocked condition.
Figure 4:
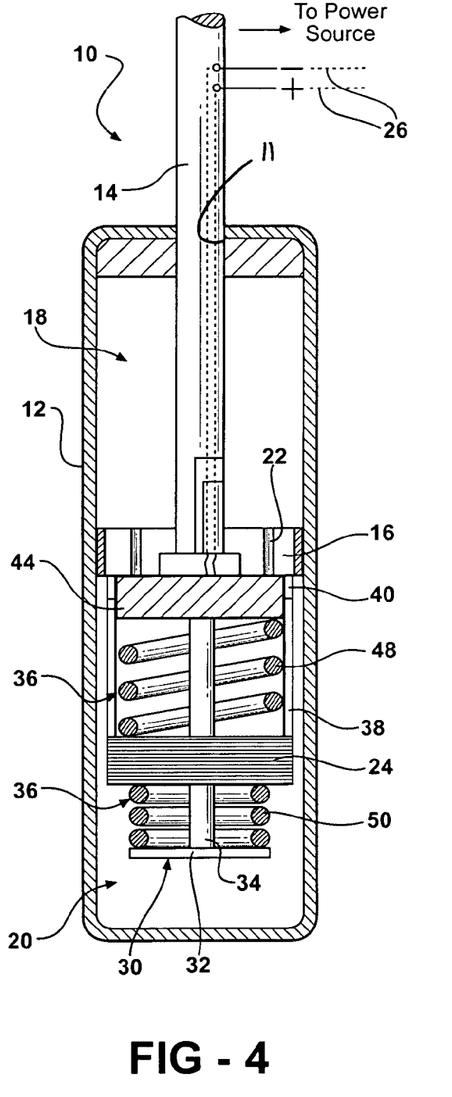
FIG. 4 is a cross-sectional view of the locking strut of FIG. 3 in the locked condition.

FIGS. 3 and 4 illustrate the locked and unlocked conditions, respectively, of a second embodiment of the locking strut 10 of the present invention. In this embodiment, the ferromagnetic plate 30 comprises a ferromagnetic flange 32, a stem 34, and a valve 44. The driver 24 is preferably mounted on a guide tube 38 extending between the driver 24 and the baffle 16. The guide tube 38 preferably mounts to the baffle 16 surrounding the orifices 22 through the baffle 16 such that fluid flows through the orifices 22 into the guide tube 38. The guide tube 38 includes a passage 40 for allowing fluid to flow into the lower chamber 20. The passage 40 may comprise a hole through or a slit around the guide tube 38. Additionally, a plurality of passages 40 may be used, with the number and size of the passages 40 determining the amount of damping provided by the locking strut 10. Alternatively, the guide tube 38 mounts to the baffle 16 such that the orifices 22 lead directly into the lower chamber 20.

The stem 34 of the ferromagnetic plate 30 extends through the driver 24 into the guide tube 38. Preferably, the valve 44 mounts to one end of the stem 34 within the guide tube 38, while the ferromagnetic flange 32 mounts to the opposite end of the stem 34 outside of the guide tube 38. However, the ferromagnetic flange 32 may also be seated within the guide tube 38. As both the valve 44 and the ferromagnetic flange 32 are mounted to the stem 34, movement of the ferromagnetic flange 32 causes movement of the valve 44. The valve spring 36 comprises a guide spring 48 disposed within the guide tube 38 between the driver 24 and the valve 44, and a plate spring 50 disposed between the driver 24 and the plate 30.

In a first configuration of the second embodiment, energizing the driver 24 magnetically attracts the ferromagnetic flange 32, causing the ferromagnetic flange 32 to move upward toward the driver 24, thereby compressing the plate spring 50. Alternatively, if the ferromagnetic flange 32 is located within the guide tube 38, energization of the driver 24 repels the ferromagnetic flange 32, causing the ferromagnetic flange 32 to move upward away from the driver 24, expanding the plate spring 50. Movement of the ferromagnetic flange 32 causes movement of the attached stem 34, and therefore movement of the valve 44, thereby expanding the guide spring 48. The valve 44 engages the baffle 16, sealing the orifices 22 to prevent flow of fluid between the chambers 18, 20, preventing further movement of the piston rod 14. As shown in FIG. 4, the valve 44 also seals the passage 40. However, because engagement of the valve 44 with the baffle 16 prevents fluid flow into the guide tube 38, sealing of the passage 40 is not necessary to lock the locking strut 10. When the driver 24 is de-energized, the guide spring 48 and the plate spring 50 urge the valve 44 and the ferromagnetic plate 30, and therefore the shaft 42, back downward, thereby unblocking the baffle 16 to resume fluid flow and normal operation of the locking strut 10.

In a second configuration, the guide spring 48 and the plate spring 50 are in the resting state when the locking strut 10 is in the locked condition shown in FIG. 4. Energization of the driver 24 repels the ferromagnetic flange 32, compressing the guide spring 48 and expanding the plate spring 50 as shown in FIG. 3. De-energization of the driver 24 urges the springs 48, 50 back to the resting state, returning the locking strut 10 to the locked condition.

Figure 5:
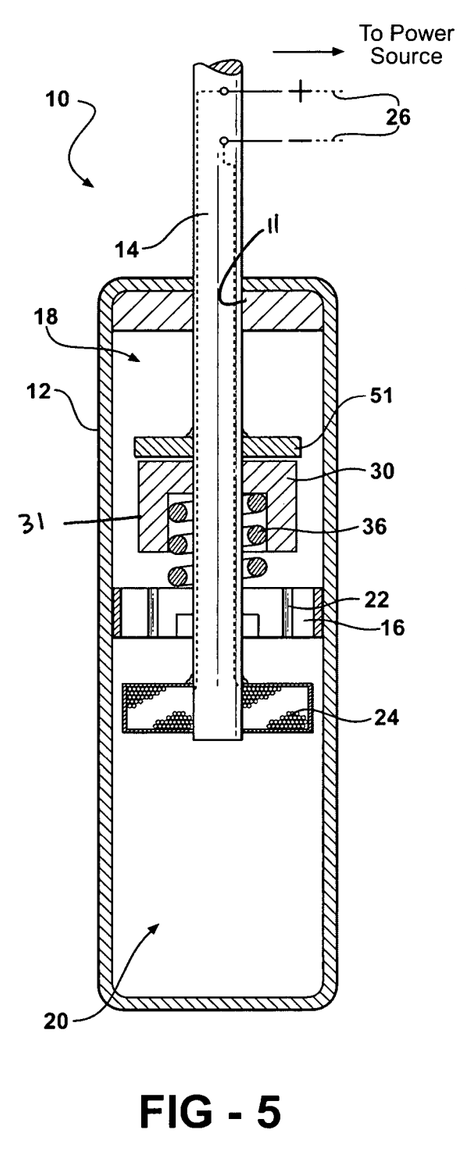
FIG. 5 is a cross-sectional view of a third embodiment of the locking strut showing the strut in the unlocked condition.
Figure 6:
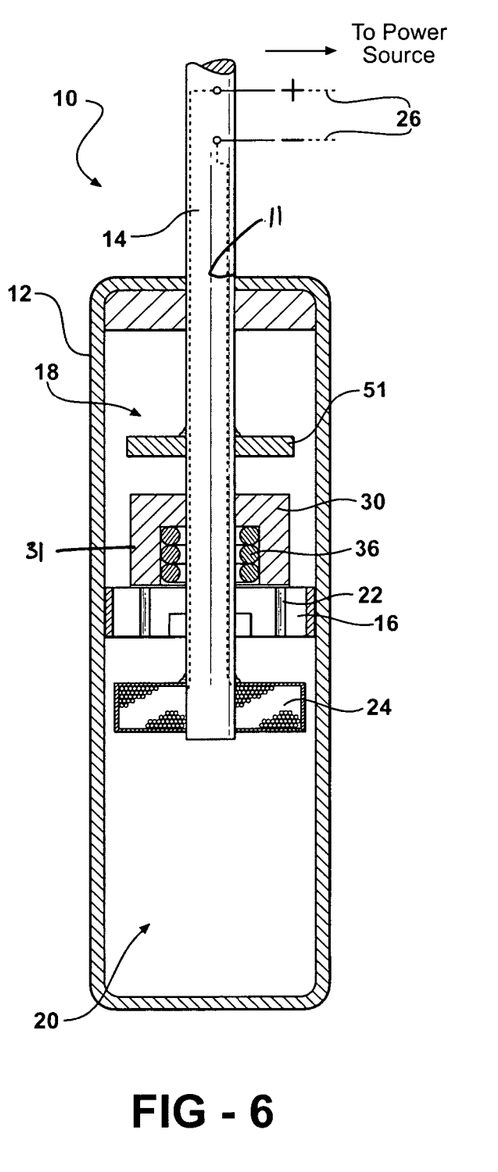
FIG. 6 is a cross-sectional view of the locking strut of FIG. 5 in the locked condition.

A third embodiment of the locking strut 10 is shown in FIGS. 5 and 6. A retaining plate 51 mounts to the piston rod 14, preferably in the upper chamber 18 above the baffle 16, for engaging the ferromagnetic plate 30 when the locking strut 10 is in the unlocked condition as shown in FIG. 5. The valve spring 36 is disposed between the ferromagnetic plate 30 and the baffle 16. Preferably, the ferromagnetic plate 30 includes an annular flange 33 enclosing the valve spring 36 and covering the orifices 22 when the locking strut 10 is in the locked condition as shown in FIG. 6. However, another shape of ferromagnetic plate 30 may be used. The driver 24 mounts to the piston rod 14 within the lower chamber 20 beneath the baffle 16. In a first configuration, energizing the driver 24 attracts the ferromagnetic plate 30 into engagement with the baffle 16 for sealing the orifices 22, and compresses the valve spring 36. De-energizing the driver 24 causes the valve spring 36 to urge the ferromagnetic plate 30 toward the retaining plate 51 and away from the baffle 16. In a second configuration, energizing the driver 24 repels the ferromagnetic plate 30 such that the ferromagnetic plate 30 disengages the baffle 16 to unblock the orifices and expands the valve spring 36. When the driver 24 is de-energized, the valve spring 36 returns to the resting state, moving the locking strut 10 back to the locked condition.

Figure 7:
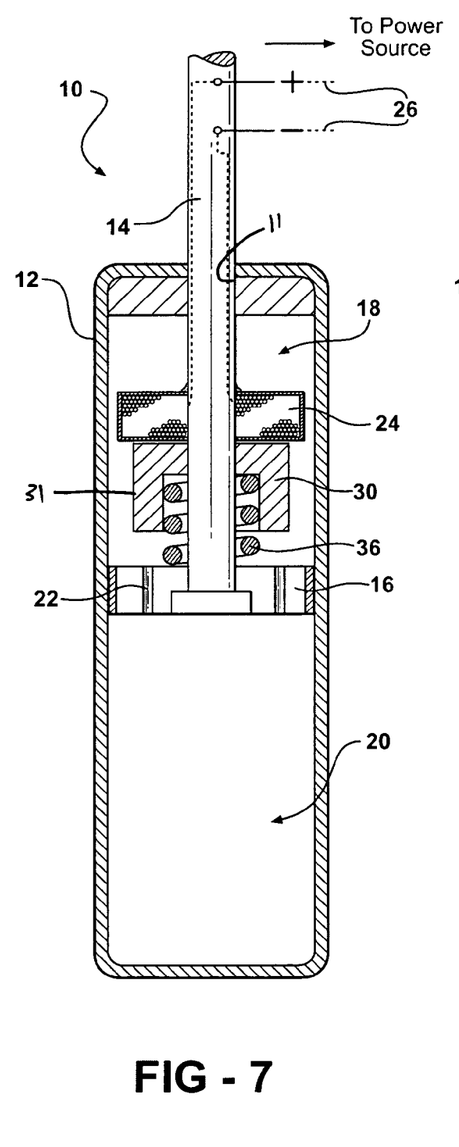
FIG. 7 is a cross-sectional view of a fourth embodiment of the locking strut showing the strut in the unlocked condition.
Figure 8:
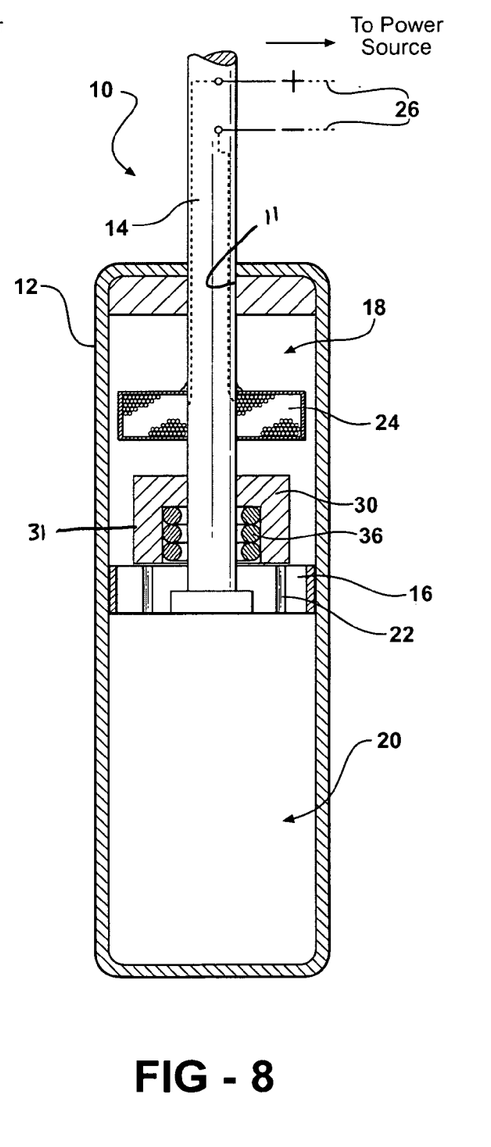
FIG. 8 is a cross-sectional view of the locking strut of FIG. 7 in the locked condition.

FIGS. 7 and 8 show a fourth embodiment of the present invention, wherein the valve spring 36 is again disposed between the ferromagnetic plate 30 and the baffle 16. The driver 24 is preferably mounted in the upper chamber 18 above the ferromagnetic plate 30, eliminating the need for the retaining plate 51. In a first configuration, energizing the driver 24 repels the ferromagnetic plate 30, compressing the valve spring 36 and moving the ferromagnetic plate 30 from the open position shown in FIG. 7 to the closed position shown in FIG. 8. In a second configuration, energizing the driver 24 attracts the ferromagnetic plate 30, expanding the valve spring 36 and moving the ferromagnetic plate 30 from the closed position shown in FIG. 8 to the open position shown in FIG. 7. De-energizing the driver 24 in each configuration returns the ferromagnetic plate 30 to the initial position.

Figure 9:
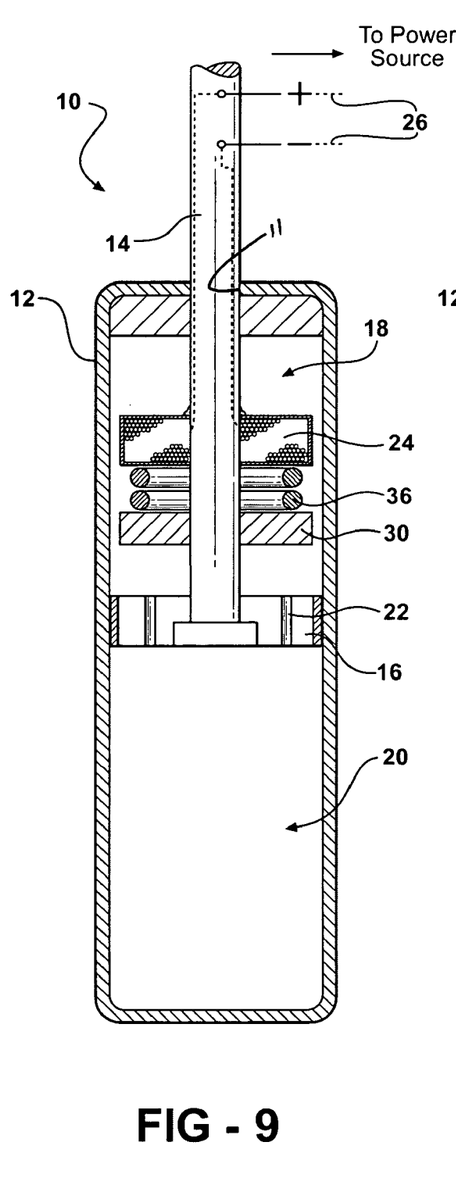
FIG. 9 is a cross-sectional view of a fifth embodiment of the locking strut showing the strut in the unlocked condition.
Figure 10:
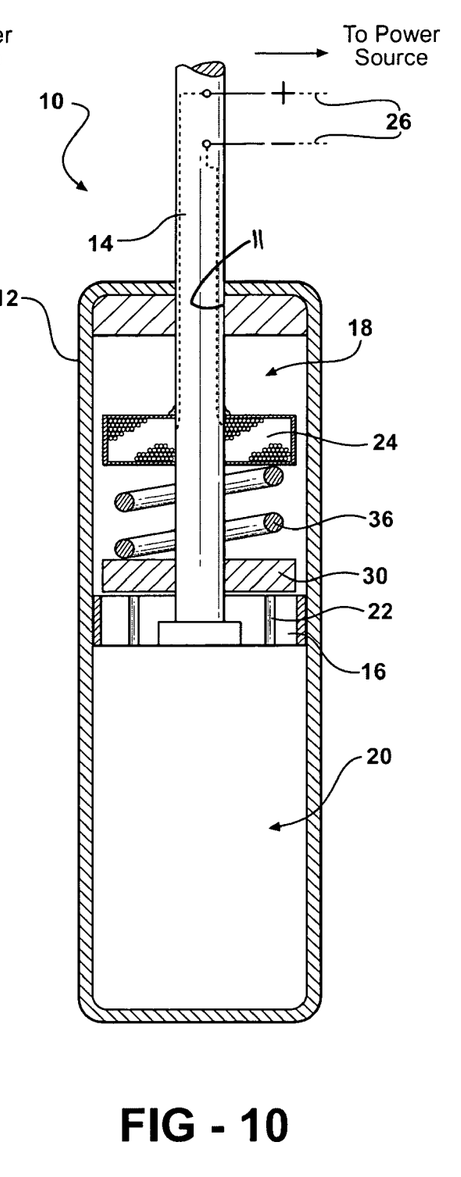
FIG. 10 is a cross-sectional view of the locking strut of FIG. 9 in the locked condition.

A fifth embodiment of the present invention is shown in FIGS. 9 and 10. In this embodiment, the driver 24 preferably mounts to the piston rod 14 in the upper chamber 18 above the ferromagnetic plate 30, with the valve spring 36 disposed between the driver 24 and the ferromagnetic plate 30. In a first configuration, energizing the driver 24 repels the ferromagnetic plate 30, expanding the valve spring 36 and moving the ferromagnetic plate 30 to the closed position shown in FIG. 10. In a second configuration, the driver 24 attracts the ferromagnetic plate 30, compressing the valve spring 36 and moving the ferromagnetic plate 30 to the open position shown in FIG. 9. As with previous embodiments, de-energization of the driver 24 returns the ferromagnetic plate 30 to the initial position.

Figure 11:
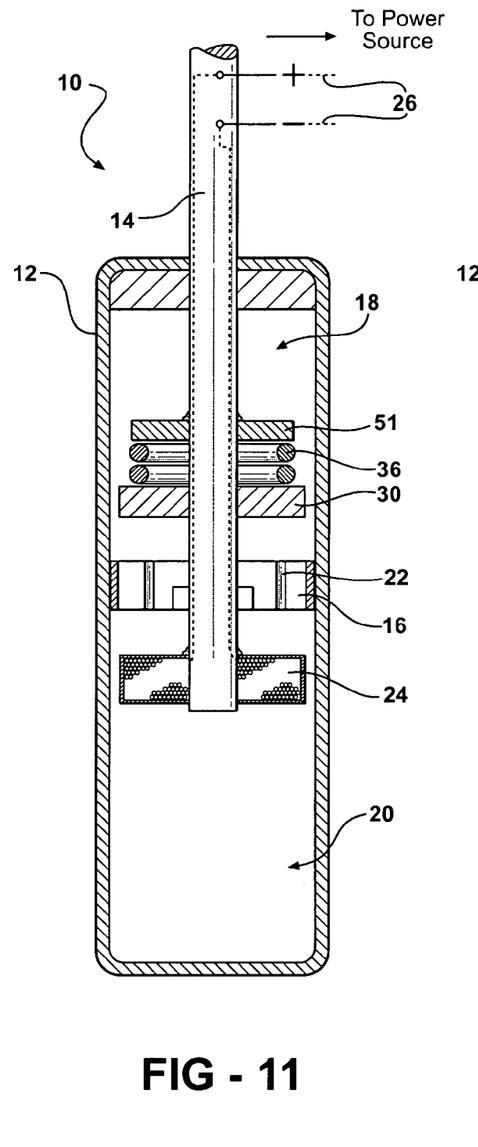
FIG. 11 is a cross-sectional view of a sixth embodiment of the locking strut showing the strut in the unlocked condition.
Figure 12:
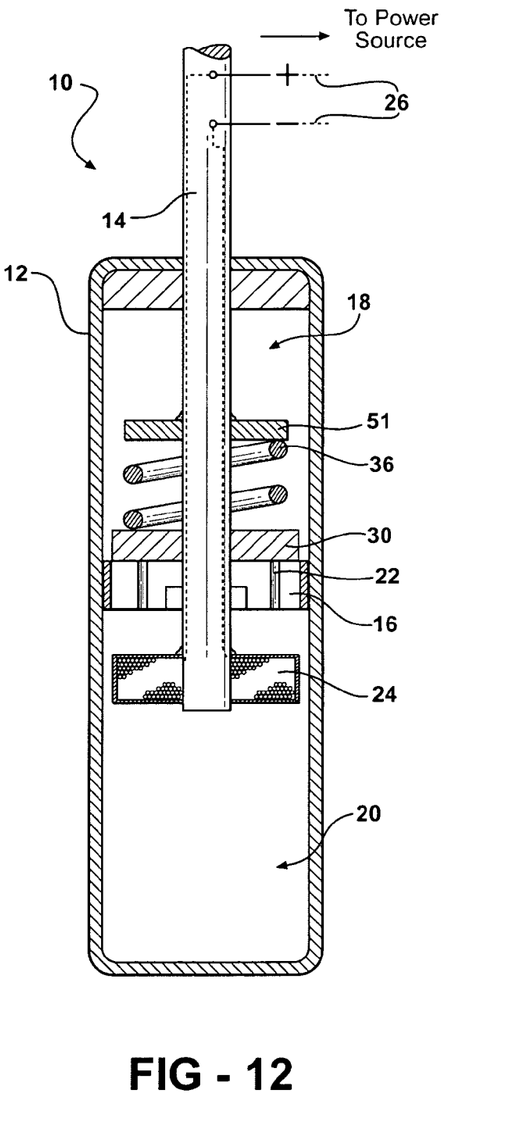
FIG. 12 is a cross-sectional view of the locking strut of FIG. 11 in the locked condition.

FIGS. 11 and 12 show a sixth embodiment of the present invention, again including a retaining plate 51, with the valve spring 36 disposed between the ferromagnetic plate 30 and the retaining plate 51. The driver 24 mounts to the piston rod 14 in the lower chamber 20. In a first configuration, the valve spring 36 sits in the resting state when the locking strut 10 is in the unlocked condition shown in FIG. 11. Energizing the driver 24 attracts the ferromagnetic plate 30, expanding the valve spring 36 and moving the ferromagnetic plate 30 to the closed position shown in FIG. 12. Conversely, in a second configuration, the valve spring 36 sits in the resting state when the locking strut 10 is in the locked condition. Energizing the driver 24 repels the ferromagnetic plate 30, compressing the valve spring 36 and moving the ferromagnetic plate 30 to the open position as shown in FIG. 11. De-energizing the driver 24 returns the ferromagnetic plate 30 to the opposite position.

Figure 13:
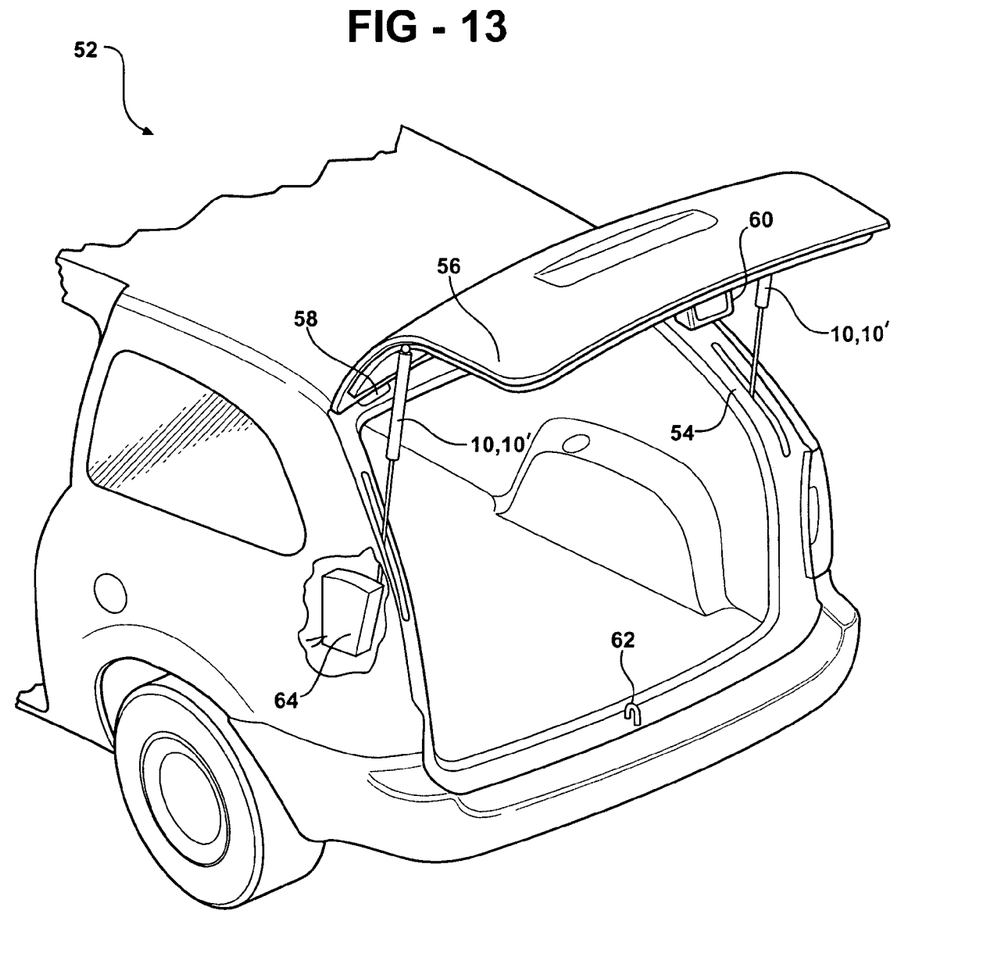
FIG. 13 is a perspective view of a rear portion of a typical vehicle incorporating a locking strut of the present invention.

Referring now to FIG. 13, the locking strut 10 is shown as used in a rear liftgate 56 of a motor vehicle 52, one of many potential uses of the present invention. When the liftgate 56 is in a closed position, the liftgate 56 securely rests adjacent a frame 54, with the liftgate 56 biased toward the closed position due to its weight. A hinge assembly 58 providing a generally horizontal hinge axis connects the liftgate 56 and the frame 54. The liftgate 56 rotates upward about the hinge axis to an open position away from the frame 54. Similarly, the liftgate 56 rotates downward about the hinge axis to return to the closed position.

A latch assembly 60 mounts on the liftgate 56 for releasably locking the liftgate 56 to the frame 54. A corresponding striker 62 mounts on the frame 54. The latch assembly 60 is preferably a power assisted latch assembly as known in the art. In such an assembly 60, the latch assembly 60 pulls the liftgate 56 fully into the closed position as the liftgate 56 nears the closed position. A liftgate seal disposed on either the liftgate 56 or the frame 54 seals the liftgate 56 to the frame 54 when the liftgate 56 is in the closed position. Additionally, the latch assembly 60 automatically releases as the liftgate 56 moves from the closed position to the open position. Alternatively, the striker 62 may be power assisted to perform the same functions as the latch assembly 60, eliminating the need to supply power to the latch assembly 60.

The vehicle 52 includes a locking strut 10 of the present invention pivotally mounted between the frame 54 and the liftgate 56. Preferably, a second strut 10 is similarly mounted on the other side of the frame 54 and liftgate 56, which may or may not be of the type contemplated by the present invention. A control system 64 disposed within the vehicle controls the locking strut 10. To open the door from the closed position, the latch assembly 60 or the striker 62 disengages the lock. If an anomaly is detected by the control system 64 while the liftgate 56 proceeds from the closed position to the open position, and thus the locking strut 10 proceeds from an extended position to a retracted position as described below, the control system 64 activates the driver 24 to cease motion of the locking strut 10. Preferably this is achieved using pulse wave modulation. Specifically, motion of the locking strut 10 is not instantly halted during movement of the liftgate 56, which could break the locking strut 10 due to internal pressure and load on the locking strut 10. Instead, locking of the locking strut 10 by blocking the orifices 22 occurs through pulse wave modulation, effecting a slower change between movement of the locking strut 10 and stoppage of movement.

When the locking strut 10 is in the fully extended position, the baffle 16 rests near the top of the housing 12, thereby creating an upper chamber 18 which is significantly smaller than the lower chamber 20, with the piston rod 14 extending almost fully outside of the housing 12. As the locking strut 10 moves from an extended position to a retracted position, the baffle 16 slides along the housing 12 to reach the fully retracted position, wherein the baffle 16 rests near the bottom of the housing 12 and the upper chamber 18 is significantly larger than the lower chamber 20. Fluid passage through the orifices 22 in the baffle 16 effects movement between the two positions. When the locking strut 10 moves from an extended position to a retracted position, fluid rushes through the orifices 22 from the upper chamber 18 to the lower chamber 20, creating a fluid pressure exerting a downward fluid force on the assembly. Conversely, moving the locking strut 10 from a retracted position to an extended position creates an upward fluid force on the assembly as fluid moves through the orifices 22 from the lower chamber 20 to the upper chamber 18. These fluid forces will have an impact on the efficiency of the assembly. For example, referring to FIGS. 1 and 2, the downward fluid force during movement from the extended position to the retracted position tends to force the ferromagnetic flange 32 away from the baffle 16. Therefore, locking of the locking strut 10 in the first configuration, for example, requires a driver force large enough to overcome both the fluid force and the spring force biasing the ferromagnetic flange 32 to the open position. Conversely, the upward fluid force during movement from the retracted position to the extended position tends to force the ferromagnetic flange 32 toward the baffle 16. Therefore, to keep the locking strut 10 in the unlocked condition, for example in the second configuration, requires a driver force large enough to overcome both the fluid force and the spring force biasing the ferromagnetic flange 32 to the closed position. These tendencies must be considered when choosing which embodiment of the present invention to utilize in a particular application. Additionally, a locking strut 10 may employ two drivers 24 to more easily resist the opposing forces. In the first configuration of the first embodiment, mounting a driver 24 in the lower chamber 20 for repelling the ferromagnetic flange 32 during movement of the locking strut 10 from the extended to the retracted position would improve performance of the locking strut 10. The second driver could also attract the ferromagnetic flange 32 to keep the locking strut 10 unlocked during movement from the retracted to the extended position in the second configuration.

While the invention is described herein for use in a motor vehicle liftgate assembly, the strut may be used in many applications where damping is desirable, including a motor vehicle shock absorber or accessory drive tensioner, or any door utilizing a strut, for example, a garage door or an industrial door.

The invention has been described in an illustrative manner. It is to be understood that the terminology which has been used is intended to be in the nature of words of description rather than of limitation. In fact, many modifications and variations of the invention are possible in light of the above teachings. Therefore, within the scope of the appended claims, the invention may be practiced other than as specifically enumerated within the description.

What is claimed is:

1. A locking strut comprising:
   a housing;
   a piston rod extending through said housing;
   a baffle mounted on said piston rod dividing said housing into two chambers, said baffle being slidingly disposed within said housing;
   an orifice through said baffle for allowing fluid to pass between said chambers;
   a ferromagnetic plate having a ferromagnetic flange mounted to a stem and disposed within said housing for movement between an open position spaced from said baffle for allowing fluid to pass through said orifice between said chambers and a closed position covering said orifice to prevent fluid flow between said chambers;
   an electromagnetic driver mounted to said piston rod and disposed within said housing, said piston rod including an opening for receiving said stem and said stem extending through said baffle into said opening, said driver being selectively energized in response to external control signals to exert a driver force, said driver force acting upon said ferromagnetic plate for selectively moving said ferromagnetic plate between said open and closed positions to control fluid flow between said chambers; and
   a valve spring exerting a spring force disposed adjacent said ferromagnetic plate and movable from a resting state wherein said valve spring is neither compressed nor expanded, said spring force being overcome by said driver force when said driver is energized to move said ferromagnetic plate between said open and closed positions;
   wherein said valve spring seats within said opening in said resting state when said ferromagnetic plate is in one of said open and closed positions, and energization of said driver attracts said ferromagnetic flange, thereby moving said ferromagnetic flange into engagement with said baffle and compressing said valve spring.

2. The locking strut as set forth in claim 1 wherein said ferromagnetic plate further comprises a valve mounted to said stem for engaging said baffle to close said orifice.

3. The locking strut as set forth in claim 2 further comprising a guide tube mounted between said driver and said baffle, said valve being slidingly disposed within said guide tube.

4. The locking strut as set forth in claim 3 wherein fluid flows through said orifice into said guide tube, said guide tube including a passage for allowing fluid to pass between said chambers.

5. The locking strut as set forth in claim 4 wherein said stem extends through said driver from said valve to said ferromagnetic flange such that movement of said ferromagnetic flange effects movement of said valve.

6. The locking strut as set forth in claim 5 wherein said valve spring comprises a guide spring disposed within said guide tube between said driver and said valve and a plate spring disposed between said driver and said ferromagnetic flange, said guide spring and said plate spring being in said resting state when said ferromagnetic plate is in said open position such that energization of said driver attracts said ferromagnetic flange, moving said stem and forcing attached said valve into engagement with said baffle, said ferromagnetic flange compressing said plate spring and said valve expanding said guide spring.

7. The locking strut as set forth in claim 5 wherein said valve spring comprises a guide spring disposed within said guide tube between said driver and said valve and a plate spring disposed between said driver and said ferromagnetic flange, said guide spring and said plate spring being in said resting state when said ferromagnetic plate is in said closed position such that energization of said driver repels said ferromagnetic flange, moving said stem and forcing attached said valve out of engagement with said baffle, said ferromagnetic flange expanding said plate spring and said valve compressing said guide spring.

8. The locking strut as set forth in claim 1 further comprising an electrical lead for supplying power to said driver, said lead extending from said driver through said piston rod to a power source.

9. The locking strut as set forth in claim 8 wherein the power source rapidly cycles current through said lead to produce a partial duty cycle for energizing said driver.

10. The locking strut as set forth in claim 1 further comprising a plurality of orifices spaced circumferentially about said baffle to provide a plurality of fluid passageways between said chambers.

11. The locking strut as set forth in claim 1 further comprising a plurality of drivers disposed within said housing.

12. A locking strut comprising:
    a housing;
    a piston rod extending through said housing;
    a baffle mounted on said piston rod dividing said housing into two chambers, said baffle being slidingly disposed within said housing;
    an orifice through said baffle for allowing fluid to pass between said chambers;
    a ferromagnetic plate disposed within said housing for movement between an open position spaced from said baffle for allowing fluid to pass through said orifice between said chambers and a closed position covering said orifice to prevent fluid flow between said chambers;
    an electromagnetic driver mounted to said piston rod and disposed within said housing, said driver being selectively energized in response to external control signals to exert a driver force, said driver force acting upon said ferromagnetic plate for selectively moving said ferromagnetic plate between said open and closed positions to control fluid flow between said chambers; and
    a valve spring disposed between said ferromagnetic plate and said baffle for exerting a spring force disposed adjacent said ferromagnetic plate and movable from a resting state wherein said valve spring is neither compressed nor expanded, said spring force being overcome by said driver force when said driver is energized to move said ferromagnetic plate between said open and closed positions; and a retaining plate mounted to said piston rod such that said ferromagnetic plate engages said retaining plate in said open position and engages said baffle in said closed position.

13. The locking strut as set forth in claim 12 wherein said valve spring is in said resting state when said ferromagnetic plate is in said open position, and energization of said driver attracts said ferromagnetic plate, thereby moving said ferromagnetic plate into engagement with said baffle and compressing said valve spring.

14. The locking strut as set forth in claim 12 wherein said valve spring is in said resting state when said ferromagnetic plate is in said closed position, and energization of said driver repels said ferromagnetic plate, thereby moving said ferromagnetic plate into engagement with said retaining plate and expanding said valve spring.

15. The locking strut as set forth in claim 12 wherein said valve spring is in said resting state when said ferromagnetic plate is in said open position, and energization of said driver repels said ferromagnetic plate, thereby moving said ferromagnetic plate into engagement with said baffle and compressing said valve spring.

16. The locking strut as set forth in claim 12 wherein said valve spring is in said resting state when said ferromagnetic plate is in said closed position, and energization of said driver attracts said ferromagnetic plate, thereby moving said ferromagnetic plate out of engagement with said baffle and expanding said valve spring.

17. A locking strut comprising:
a housing;
a piston rod extending through said housing;
a baffle mounted on said piston rod dividing said housing into two chambers, said baffle being slidingly disposed within said housing;
an orifice through said baffle for allowing fluid to pass between said chambers;
a ferromagnetic plate disposed within said housing for movement between an open position spaced from said baffle for allowing fluid to pass through said orifice between said chambers and a closed position covering said orifice to prevent fluid flow between said chambers;
an electromagnetic driver mounted to said piston rod and disposed within said housing, said driver being selectively energized in response to external control signals to exert a driver force, said driver force acting upon said ferromagnetic plate for selectively moving said ferromagnetic plate between said open and closed positions to control fluid flow between said chambers;
a valve spring disposed between said ferromagnetic plate and said baffle for exerting a spring force disposed adjacent said ferromagnetic plate and movable from a resting state wherein said valve spring is neither compressed nor expanded, said spring force being overcome by said driver force when said driver is energized to move said ferromagnetic plate between said open and closed positions; and
a retaining plate mounted to said piston rod, said valve spring being disposed between said retaining plate said ferromagnetic plate.

18. The locking strut as set forth in claim 17 wherein said valve spring is in said resting state when said ferromagnetic plate is in said open position, and energization of said driver attracts said ferromagnetic plate, thereby moving said ferromagnetic plate into engagement with said baffle and expanding said valve spring.

19. The locking strut as set forth in claim 17 wherein said valve spring is in said resting state when said ferromagnetic plate is in said closed position, and energization of said driver repels said ferromagnetic plate, thereby moving said ferromagnetic plate out of engagement with said baffle and compressing said valve spring.

* * * * *